United States Patent
Ganesan et al.

(10) Patent No.: US 9,350,590 B2
(45) Date of Patent: May 24, 2016

(54) METHOD, SYSTEM AND APPARATUS FOR CARRIER FREQUENCY OFFSET CORRECTION AND CHANNEL ESTIMATION

(71) Applicant: TEXAS INSTRUMENTS INCORPORATED, Dallas, TX (US)

(72) Inventors: Raghu Ganesan, Bangalore (IN); Sarma S Gunturi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/273,686

(22) Filed: May 9, 2014

(65) Prior Publication Data

US 2015/0117575 A1   Apr. 30, 2015

(30) Foreign Application Priority Data

Oct. 25, 2013  (IN) .............. 4828/CHE/2013

(51) Int. Cl.
*H04L 27/26* (2006.01)
*H04L 25/02* (2006.01)

(52) U.S. Cl.
CPC ........ *H04L 27/2695* (2013.01); *H04L 25/0224* (2013.01); *H04L 27/266* (2013.01); *H04L 27/2613* (2013.01); *H04L 27/2675* (2013.01)

(58) Field of Classification Search
CPC ............ H04L 25/0228; H04L 25/0236; H04L 25/0202; H04L 25/0204; H04L 27/2647; H04L 27/2675; H04L 25/0206; H04L 25/022; H04L 25/0224; H04L 1/0631; H04L 25/0222; H04L 2025/03783; H04L 27/2695; H04L 27/2613; H04L 27/266; H04B 7/0413; H04B 7/0452; H03M 13/6527

See application file for complete search history.

(56) References Cited

U.S. PATENT DOCUMENTS 7,277,473 B2 * 10/2007 Wei ...................... H04B 1/7115
                                                              375/148
2010/0086013 A1 * 4/2010 Pare et al. .................... 375/219

* cited by examiner

*Primary Examiner* — Vineeta Panwalkar
(74) *Attorney, Agent, or Firm* — Ronald O. Neerings; Frank D. Cimino

(57) ABSTRACT

A receiver is configured to use a first part of a received signal and a second part of the received signal to determine, respectively, a first estimate and a second estimate of the channel. The first and second parts carry information for decoding the received signal in a first protocol and in a second protocol, respectively. A final estimate of the channel is performed from the first and the second estimates. The final estimate is then used for decoding the data in the received signal according to one of the protocols. A carrier frequency offset from a set of symbols occurring prior to preamble symbols is determined and is corrected for decoding the preamble symbols. The corrected preamble symbols are then used for estimating the channel. In one embodiment, the carrier frequency offset is determined for the multiple antenna packet format used in the 802.11n standard.

18 Claims, 3 Drawing Sheets

FIG. 5A

| L-STF<br>CS = 0 ns | L-LTF<br>CS = 0 ns | HT-LTF1<br>CS = 0 ns | HT-SIG<br>CS = 0 ns | HT-LTFs<br>CS = 0 ns | HT-eLTFs<br>CS = 0 ns | DATA<br>CS = 0 ns |
|---|---|---|---|---|---|---|
| 8 μs | 8 μs | 8 μs | 8 μs | 4 μs/sym | 4 μs/sym | 4 μs/sym |

FIG. 5B

| L-STF<br>CS = 0 ns | L-LTF<br>CS = 0 ns | L-SIG<br>CS = 0 ns | HT-SIG<br>CS = 0 ns | HT-STF<br>CS = 0 ns | HT-LTFs<br>CS = 0 ns | HT-eLTFs<br>CS = 0 ns | DATA<br>CS = 0 ns |
|---|---|---|---|---|---|---|---|
| 8 μs | 8 μs | 4 μs | 8 μs | 4 μs | 4 μs/sym | 4 μs/sym | 4 μs/sym |

FIG. 5C

| | 1st symbol | 2nd symbol |
|---|---|---|
| $TX_1$ | $S_0$ | $-S_1^*$ |
| $TX_2$ | $S_1$ | $S_0^*$ |
| | $R_0$ | $R_1$ |

METHOD, SYSTEM AND APPARATUS FOR CARRIER FREQUENCY OFFSET CORRECTION AND CHANNEL ESTIMATION

CROSS REFERENCES TO RELATED APPLICATIONS

This application claims priority from Indian patent application No. 4828/CHE/2013 filed on Oct. 25, 2013, which is hereby incorporated in its entirety by reference.

TECHNICAL FIELD

The present disclosure relates generally to signal processing and more specifically to a method, system and apparatus for carrier frequency offset correction and channel estimation.

RELATED ART

In a communication system, a known sequence of data (generally referred to as a preamble or a training sequence) is often transmitted over a communication channel. A receiver in the communication system compares the received preamble bits with the known preamble to determine the behavior of the communication channel (channel transfer function). The channel transfer function is then used for decoding the data that follows the preamble. For example, once a channel transfer function is determined, the received signal is compensated with the inverse of the estimated transfer function to extract the transmitted signal, as is well known in the art. Determining the transfer function of the channel is referred as channel estimation.

Often, other parameters such as carrier frequency offset for example, influence the received preambles. For example, the presence of residual carrier frequency offset error affects the channel estimation and hence increases the bit error rate (degrades signal to noise ratio). In the case of a multiple input and multiple outputs (MIMO) system employing more than one transmit antennas and/or receive antennas, the effect of carrier frequency offset (CFO) is more severe as the CFO causes coupling of the spatial streams resulting in inter-spatial stream interference. Accordingly, estimating the channel without correcting the carrier frequency offset results in erroneously defining the channel transfer function, which may negatively affect the decoding of data that follows the preamble.

SUMMARY

According to an aspect of the present disclosure, a first part of a received signal is used to determine a first estimate of a channel and a second part of the received signal is used to determine a second estimate of the channel. The first part and the second carry information for decoding the received signal according to a communication standards or protocols catering to users/devices of different generations. A final estimate of the channel is performed from the first and the second estimate. The final estimate is then used to decode the desired part of the data in the received signal according to the protocols. Advantageously, the desired part of the packets can be successfully decoded with fewer errors by using the improved final channel estimate.

According to another aspect of the present disclosure, a receiver is configured to determine a residual carrier frequency offset from a set of symbols. The thus-determined carrier frequency offset is then corrected in the preamble symbols. The decoded preamble symbols are then used for estimating the channel. In one embodiment, a residual carrier frequency offset is determined for the MIMO packet format which is based on 802.11n standard based communication system. The correction of residual carrier frequency offset in the preambles improves MIMO channel estimation and subsequently the packet error rate performance.

Several aspects are described below, with reference to diagrams. It should be understood that numerous specific details, relationships, and methods are set forth to provide a full understanding of the present disclosure. One skilled in the relevant art, however, will readily recognize that the present disclosure can be practiced without one or more of the specific details, or with other methods, etc. In other instances, well-known structures or operations are not shown in detail to avoid obscuring the features of the present disclosure.

BRIEF DESCRIPTION OF DRAWINGS

FIG. 5A shows a frame structure that is configured to enable transmission of information in a MIMO configuration according to high throughput mode (referred to as green field).

FIG. 5B shows a frame structure that is configured to enable transmission of information in a MIMO configuration in a mixed mode, according to one embodiment. FIG. 5C illustrates an example symbol transmission in the two antennas (two channels H0 and H1) scenatio.

DETAILED DESCRIPTION

Figure 1:
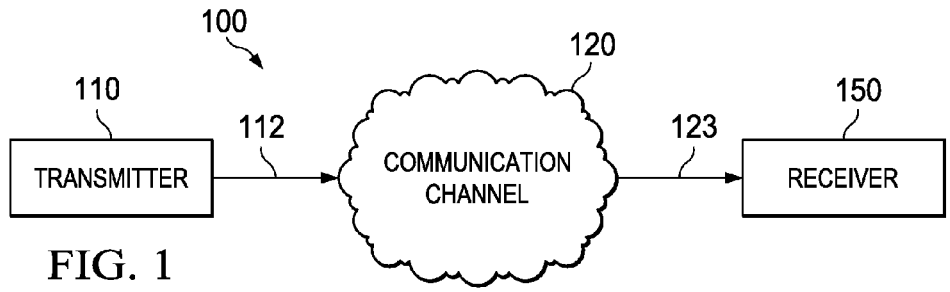
FIG. 1 is an example system in which various aspects of the present disclosure are seen.

FIG. 1 shows an example system in which various aspects of the present disclosure are seen. As shown, the system 100, in one embodiment, comprises a transmitter 110, a communication channel 120, and receiver 150. Each element is described in further detail below.

The transmitter 110 transmits signal on path 112 (transmitted signal) carrying information/data according to one or more communication protocol, standards or modes of transmission. The transmitter transmits some part of the data in one mode and other part of the data in another mode. For example, during transmission of a training sequence or preambles, the transmitter transmits the preambles in one or more modes to the receivers of the respective modes to decode the data. The transmitter 110 is further configured to carry out baseband signal processing, modulation, up-conversion, radio frequency amplification and other operations required to generate a transmit signal carrying the data according to the desired standard(s)/protocol or modes. In one embodiment, the transmitter transmits the signal using multiple antennas. For example, the transmitter employs any multiple inputs and multiple outputs (MIMO) transmission technique, such as phase rotation, to transmit the signal using multiple antennas.

The communication channel 120 carries a signal transmitted on path 112 over a wireless or wired medium. The communication channel 120 modifies/distorts the transmitted signal by, for example, adding noise to the transmitted signal, introducing amplitude and/or phase distortion, fading, as is well known in the art. The modified signal is provided on the path 123. In one embodiment, the communication channel 120 is a wireless local area network (WLAN) channel configured to propagate the signal transmitted from the transmitter 110.

Receiver 150 is configured to receive a signal on path 123 (received signal) from the communication channel 120. The receiver 150 and transmitter 110 employ one or more antennas to transmit and receive the signal over the channel 120. When more than one antennas are employed, the transmitter 110 and receiver 150 is configured employ multiple inputs and multiple outputs (MIMO) transmission techniques such as phase rotation, to transmit the signal through multiple antennas. Alternatively, transmitter and receiver employ one of SISO, MISO, and SIMO configuration.

In one embodiment, the receiver 150 extracts data in a desired mode by advantageously using a part of the transmitted signal intended for estimating the channel for reception of data in other mode. Thus, the accuracy of channel estimation for decoding the data in the desired mode is enhanced. The manner in which the receiver 150 estimates the channel characteristics from the received signal is further described below.

Figure 2:
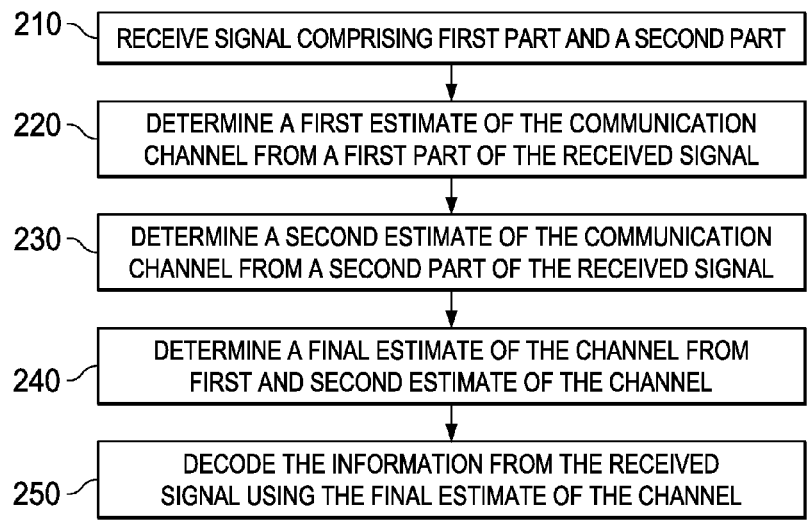
FIG. 2 is a block diagram illustrating the operation of the receiver in one embodiment.

FIG. 2 is a block diagram illustrating the operation of the receiver 150 in one embodiment. In the block 210, the receiver 150 receives a signal comprising a first part and a second part. The first part of the received signal comprises information that enables the receiver 150 to receive and extract data in the first mode and a second part of the received signal comprises information that enables the receiver to receive and extract data in the second mode.

In block 220, the receiver 150 determines a first estimate of the communication channel 120 from the first part of the received signal. In the block 230, the receiver 150 determines a second estimate of the communication channel 120 from the second part of the received signal.

In block 240, the receiver 150 determines a final estimate of the channel from first and second estimates of the communication channel. In block 250, the receiver 150 decodes the information from the received signal using the final estimate of the channel. In one embodiment, the receiver uses the final estimate of the channel to extract the data encoded and transmitted in the second mode from the received signal. Thus, the receiver 150 advantageously uses the information present in the first part of the received signal (intended for decoding in first mode) to enhance the accuracy of decoding in the second mode (or to increase the signal to noise ratio of the channel estimation).

Accordingly, in one embodiment, the receiver operative in a communication systems involving multiple preambles catering to the users belonging to different generations of protocols, as it is the case with Mixed-mode packet format pertaining to IEEE802.11n, where L-LTFs for legacy users and HT-LTFs for 802.11n users are transmitted, the information from these multiple preambles are combined to obtain a better estimate of the channel, leading to better performance.

The manner in which the communication channel is estimated from the received signal is further described below by referring to the communication standard 802.11/n merely for illustration.

Figure 3A:
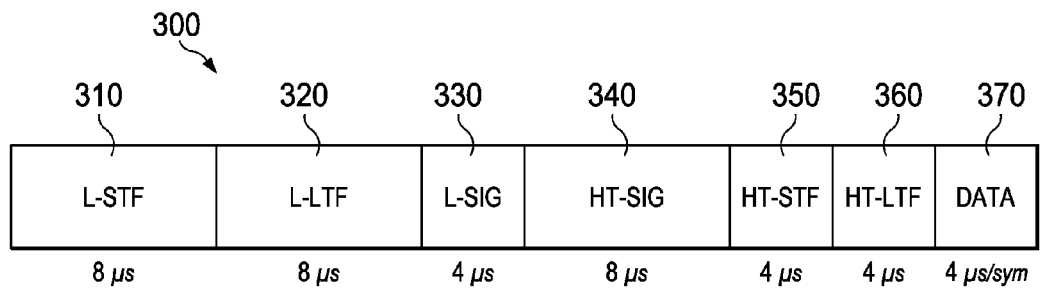
FIG. 3A is an example mixed mode frame structure that is supported by the 802.11/n standard.

FIG. 3A shows an example high throughput mixed mode (HT-MM) frame structure that is supported by the 802.11/n standard. The mixed mode frame structure 300 (HT-MM) enables the both legacy receivers and IEEE802.11n compliant receivers to receive the data packet. The frame structure 300 is shown comprising the L-STF (legacy short training field) 310, L-LTF (legacy long training field) 320, L-SIG (legacy signal field) 330, HT-SIG (High throughput signal field) 340, HT-STF (High through put-short training field) 350, HT-LTF (High throughput long training field) 360, and data field 370.

The fields/packets L-STF 310, L-LTF 320 and L-SIG 330 correspond to the low throughput mode communication supported in the 802.11n standard. The L-STF 310 and L-LTF 320 are preambles for channel estimation and the L-SIG 330 carries data that describes the packet structure, modulation scheme, and data size etc., for decoding the data when the information is transmitted in the low throughput mode. Similarly, the fields/packets HT-STF 350, HT-LTF 360 and HT-SIG 340 correspond to the high throughput mode communication supported in the 802.11n standard. The HT-STF 350 and HT-LTF 360 are preambles for channel estimation and HT-SIG 340 carries data that describes the packet structure, modulation scheme, and data size etc., for decoding the data when the transmitter transmits the data in high throughput mode.

Figure 3B:
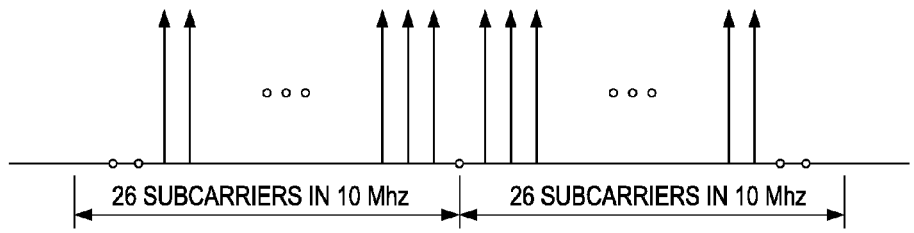
FIG. 3B illustrates fifty two OFDM (Orthogonal frequency division multiplexed) exemplary tones, and the frequency band occupied by the fifty two OFDM tones.
Figure 3C:
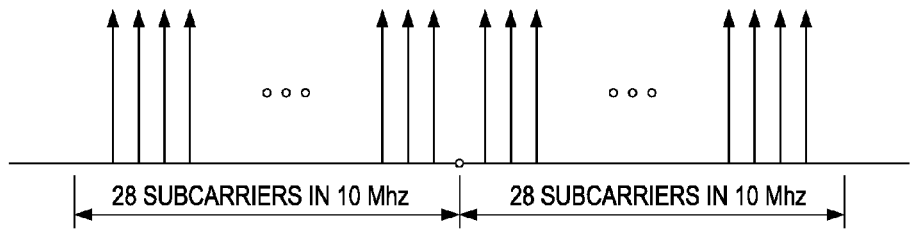
FIG. 3C illustrates fifty six exemplary OFDM (Orthogonal frequency division multiplexed) tones, and the frequency band occupied by the fifty two OFDM tones.

The fields/packets L-STF 310, L-LTF 320 and L-SIG 330 and HT-SIG 340 are transmitted using fifty two OFDM tones. The frequency band occupied by the fifty two OFDM tones are depicted in FIG. 3B for illustration. The fields/packets HT-STF 350 and HT-LTF 360 are transmitted using fifty six OFDM tones. The frequency band occupied by fifty six OFDM tones are depicted in FIG. 3C for illustration. As may be appreciated, the L-LTF and HT-LTF have fifty two common tones or sub-carriers.

As may be appreciated, in HT-MM, the preambles of HT-MM are inserted following legacy preambles (L-STF, L-LTF and L-SIG. Comparing with High throughput Green field (HT-GF) packet, the HT-MM has lesser preambles (only one High throughput long training field, i.e., HT-LTF in HT-MM) for channel estimation. The less preamble results in poor channel estimation as against HT-GF, which has 2 repetitions of LTF that results in channel estimate being 3 dB better than HT-MM.

A conventional receiver complying with IEEE802.11n systems, the channel estimation for decoding the data packet is performed only during the HT-LTFs. Such approach is suitable for channel estimation in HT-GF format as HT-GF has only HT-LTFs. However, in HT-MM format, the conventional receivers use the channel estimation performed during L-LTF to decode the header information (HT-SIG) in the packet. After the decoding of the header channel estimates from L-LTF are discarded and a new set of channel estimates are computed using HT-LTFs. Since the observation time is limited (only one replica of HT-LTF in HT-MM packet as against two replicas of HT-LTFs in Green-field packet HT-GF), the channel estimation is degraded, leading to poor performance in HT-MM compared to HT-GF.

In one embodiment of the present disclosure, when the receiver 150 is configured to operate in SISO mode, the receiver 150 combines the channel estimates across the L-LTF and HT-LTF for the fifty two sub-carriers that are common to both L-LTF and HT-LTF. Thus, the channel estimate of the fifty two tones is improved. The receiver 150 refines the channel coefficients of fifty two averaged tones and remaining 4 additional tones to further improve the channel estimation performance.

For example, in the L-LTF duration of 8 micro seconds, two 3.2 micro seconds' sequences are repeatedly transmitted. In one embodiment, the receiver 150 estimates the channel for each subcarrier during the two repeated sequences. The un-smoothened or raw channel estimate for a $k^{th}$ subcarrier during the first sequence in the L-LTF is represented as:

$$\hat{H}_1(k) = \frac{R_1(k)}{S(k)} = H(k) + W_1(k) \quad (1)$$

in which $\hat{H}_1(k)$ represents the $k^{th}$ (raw) channel estimate on the $k^{th}$ subcarrier, $R(k)$ is the received symbol value of the $k^{th}$ sub carrier, $S(k)$ represents the transmitted symbol (known preamble) in the $k^{th}$ subcarrier, $W(k)$ represents the noise in the $k^{th}$ subcarrier and the subscript 1 represents the computation during the first sequence in the L-LTF transmitted during first 4 micro seconds of 8 micro seconds duration.

Similarly, the raw channel estimate at a $k^{th}$ subcarrier during the second sequence in the L-LTF is represented as:

$$\hat{H}_2(k) = \frac{R_2(k)}{S(k)} = H(k) + W_2(k) \quad (2)$$

in which subscript 2 represents the computation during the second sequence in the second 4 microseconds of 8 micro seconds duration of the L-LTF.

The receiver 150 decodes the HT-SIG field to check the received signal compliance to the high throughput communication mode. As the channel can be assumed to be constant during the packet, the receiver 150 estimates the channel for each subcarrier during the HT-LTF transmitted for duration of 4 micro seconds. The raw channel estimated during the HT-LTF frame duration is represented as:

$$\hat{H}_3(k) = \frac{R_3(k)}{S(k)} = H(k) + W_3(k) \quad (3)$$

in which, the subscript 3 represents the computation during reception of HT-LTF.

The receiver 150 averages the raw channel estimates of the relations (1)-(3) to improve the SNR of the channel estimate. Since, the RMS power during the transmission of L-LTF is spread over fifty two tones and the Root Mean Square (RMS) power during the transmission of HT-LTF is spread over fifty six tones, the estimates in the relation 1 and 2 is scaled down for determining the average in one embodiment. Accordingly, the receiver 150 is configured to (combining) determine average by scaling the estimates in relation 1 and 2. The average of the channel estimate $\hat{H}(k)$ thus computed is represented as:

$$\tilde{H}(k) = \frac{(\alpha)(\hat{H}_1(k) + \hat{H}_2(k)) + \hat{H}_3(k)}{3} = H(k) + \frac{W_1(k) + W_2(k) + W_3(k)}{3} \quad (4)$$

in which, the variable k ranges in value from 1 to 52 for each common subcarrier. The $\alpha$ represents the scaling factor to equate the power of the sub-carriers/tones in L-LTF & HT-LTF. In one embodiment the value of $\alpha$ is $\sqrt{(52/56)}$ that is square root of (52/56). As may be appreciated, the technique of averaging, as per the above equations, is suited when the transmitter 110 and receiver 150 are configured and operative in SISO mode.

However, IEEE802.11n standard supports space time block codes (STBC) (Alamotti codes) for encoding data for transmission and reception in MIMO configuration. In the MIMO mode, the number of HT-LTFs and symbol waveforms depend on the number of transmit antennas. For example, in a 2×1 antenna system, 2 HT-LTFs are transmitted in addition to the 2 L-LTFs. Since in MIMO system, the L-LTF and HT-LTF in the HT-MM packet format, have different cyclic shift, the direct averaging of the channel estimate results with an error. Thus, in one embodiment, the receiver 150 uses the cyclic shift information to estimates and combines the channel estimations.

For example, in time domain, both L-LTF and HT-LTF have same root mean square (RMS) power. Thus, in frequency domain, the sub carrier amplitude ($X_{lk}$) for L-LTF and subcarrier amplitude ($X_{hk}$) for H-HTF is related as:

$$X_{hk} = \alpha X_{lk} \quad (5)$$

The channel coefficient from $t^{th}$ transmit antenna to $r^{th}$ receiver antenna on the $k^{th}$ sub-carrier is represented as $H_{t\,r,k}$. The received signal on $r^{th}$ receiver antenna on a $k^{th}$ sub-carrier for $n^{th}$ LTF is represented as $R_{r\,k,n}$. The phase rotation on $k^{th}$ sub-carrier due to the known cyclic shifts in L-LTF and HT-LTF are respectively represented as $\theta_{k,l}$ and $\theta_{k,n}$. From relation (5), The signal received on the signal received on $r^{th}$ antenna for 2 L-LTF and 2 HT-LTF transmissions system is represented using relation:

$$R_{rk} = AH_{r,k} + N_k \quad (6)$$

In that, $$R_{rk} = \begin{pmatrix} R_{rk,1} \\ R_{rk,2} \\ R_{rk,3} \\ R_{rk,4} \end{pmatrix}, A = \begin{pmatrix} X_{lk} & X_{lk} e^{j\theta_{k,l}} \\ X_{lk} & X_{lk} e^{j\theta_{k,l}} \\ \propto X_{lk} & \propto X_{lk} e^{j\theta_{k,l}} \\ -\propto X_{lk} & -\propto X_{lk} e^{j\theta_{k,l}} \end{pmatrix},$$

$$H_{r,k} = \begin{pmatrix} H_{1r,k} \\ H_{2r,k} \end{pmatrix} \text{ and } N_k = \begin{pmatrix} N_{k,1} \\ N_{k,2} \\ N_{k,3} \\ N_{k,4} \end{pmatrix}$$

The component $N_k$ is noise at the receiver. The minimum mean square estimate for the channel coefficients $\hat{H}_{r,k}$ is obtained from the relation:

$$\hat{H}_{r,k} = (A^*A)^{-1} A^* R_{rk} \quad (7)$$

Wherein A* denotes a conjugate transpose of A. The channel estimation according to relation 7 is performed for all receive antennas to estimate the complete set of coefficients. The four additional sub-carriers in HT-LTF have no corresponding sub-carriers in L-LTF so estimates for them are obtained from HT-LTF only.

In one embodiment, for example, in case of appreciable residual CFO, the phase offset estimated from the HT-SIG1 and/or HT-SIG2 are used to correct the phase offset between the HT-LTFs before combining with L-LTF for coherent addition.

Figure 4:
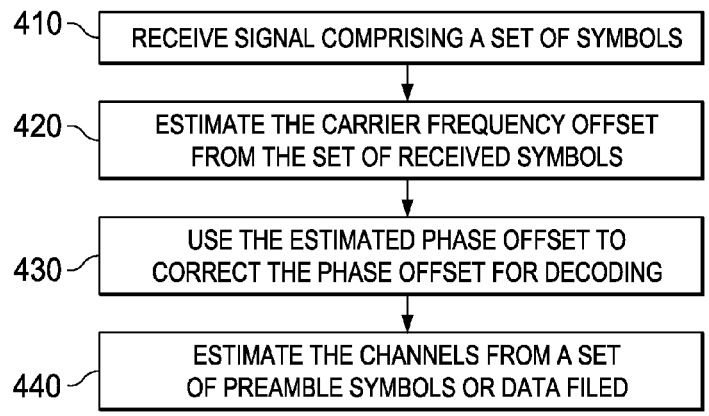
FIG. 4 is a block diagram illustrating the manner in which a receiver determines and correct the carrier frequency offset prior to channel estimation, according to one embodiment.

FIG. 4 is a block diagram illustrating the manner in which the receiver 150 determines and correct the carrier frequency offset prior to channel estimation when MIMO transmission technique is used in one embodiment. In the block 410, the receiver 150 receives signal comprising a set of symbols. The set of symbols are from L-SIG fields and/or HT-SIG fields of HT-MM and/or HT-GF. In one embodiment, the receiver 150 receives symbols comprising symbols that occur after the short sequence (L-STF) and the long sequence (L-LTFs or HT-LTFs) to estimate the residual CFO.

In the block 420, the receiver 150 estimates the phase offset (frequency offset) from each of the frequency tones in the signal fields (for example, L-SIG or HT-SIG). In one embodiment, receiver uses the decision directed schemes for determining the phase offset when the signal fields are transmitted in Binary Phase Shift Keying (BPSK) modulation format or in Offset-BPSK modulation format. In that, a decision on the received constellation for each data tone is used to estimate the phase offset for each tone in that symbol. For example, the phase offset of data tones of HT-SIG when the fields are transmitted in offset-BPSK format, are estimated using a relation:

$$\phi_{DATABINS} = \tan^{-1}\left\{\frac{Q_{DATABINS}}{I_{DATABINS}}\right\} - \phi_{REF} \text{ wherein} \quad (8)$$

$$\phi_{REF} = \begin{cases} \frac{\pi}{2} & \text{if } \tan^{-1}\left\{\frac{Q_{DATABINS}}{I_{DATABINS}}\right\} > 0 \\ -\frac{\pi}{2} & \text{if } \tan^{-1}\left\{\frac{Q_{DATABINS}}{I_{DATABINS}}\right\} \leq 0 \end{cases}$$

in which $\phi_{DATABINS}$ represents set of phase offset corresponding to the set of data symbols received, $Q_{DATABINS}$ represents the quadrature component of the set of received symbol, $I_{DATABINS}$ represents the in-phase component of the set of received symbols. The phase offset of data value are combined with the phase offset of the pilot tones to give the final phase offset for correction. The phase offset estimates from all the tones are collected and combined to give an improved estimate.

The individual phase offset computed for each and every tone (also compute for each data tone/pilot tone in the sub-carrier band) according to the relation 6 below is weighed by the channel magnitude and summed to obtain the overall phase offset for correction. In one embodiment, the receiver 150 computes the overall phase offset using relation:

$$\hat{\phi} = \sum_k \phi_k \cdot w_k \text{ wherein } w_k = \frac{|H_k|^2}{\sum_k |H_k|^2}, \quad (9)$$

wherein $H_k$ is estimate of the channel for the Kth symbol. In another embodiment, all the tones are combined using maximal ratio combining (MRC) technique and then phase offset estimate is obtained by taking angle of the MRC estimate. The angle of the MRC estimate is performed by using relation:

$$\hat{\phi} = \angle\left(\sum_{k=1}^{N} R_k \omega_k \text{sign}(\mathcal{J}(R_k))e^{-j\pi/2}\right), \text{ wherein } \omega_k = \frac{|H_k|^2}{\sum_{k=1}^{N} |H_k|^2} \quad (10)$$

In block 430, the receiver 150 corrects the phase offset to decode the preamble symbols/training sequence using the estimated phase offset. The decoded preamble/symbols are then used to estimate the channel. For example, the receiver corrects the phase offset between the HT-LTFs. The phase offset is corrected using any known technique.

In block 440, the receiver 150 performs the estimate of the channels from a set of preamble symbols or data field. For example, the receiver estimates the channel from decoded HT-LTF. The manner in which the receiver 150 determines the carrier frequency offset and correct the frequency offset for improved channel estimation is further described below with an example 802.11n multiple antenna packet structure for illustration.

FIG. 5A shows a frame structure configured to enable transmission of information in MIMO configuration according to a high throughput mode (referred to herein as green field (HT-GF)). FIG. 5B shows a frame structure configured to enable transmission of information in MIMO configuration according to a mixed mode (HT-MM). As shown, in each frame structure, HT-LTFs are repeated as many number of times as the number of antennas used at the transmitter. A known cyclic diversity technique is used to transmit the symbols in the LTFs. The manner in which the symbols are decoded in the MIMO communication system is briefly described for continuity. FIG. 5C illustrates the example symbol transmission in the two antennas (two channels H0 and H1) scenario. As shown therein, the antenna 1 ((TX1) and antenna 2 (TX2) transmit symbol $S_0$ and $S_1$, respectively, in the LTF1 field. During LTF2, the antenna 1 ((TX1) and antenna 2 (TX2) respectively transmit conjugates $s_1^*$ and $s_0^*$ of the symbols $S_1$ and $S_0$. At the receiver, the symbols are decoded by combining the estimated channel response of the two channels. The manner in which the symbols are decoded from the combined channel estimates is illustrated below.

The symbol received ($R_0$) in the first symbol period (for example in LTF1) and the symbol received ($R_1$) in the second symbol period (for example in LTF2) are represented using the combined channel estimation relation:

$$R_0 = S_0.H_0 + S_1.H_1 \text{ and } R_1 = -S_1^*.H_0 + S_0^*.H_1 \quad (10)$$

in which $H_0$ and $H_1$ represents the two MIMO channels.

From the relation 10 above, the received symbols are decoded using relation:

$$\hat{S}_0 = R_0.\hat{H}_0^* + R_1^*.H_1 \text{ and } \hat{S}_1 = R_0^*.H_1 - R_1.\hat{H}_0^* \quad (11)$$

in which $\hat{S}_0$ and $\hat{S}_1$ are decoded symbols, $R_0^*$ and $R_1^*$ are the complex conjugates of $R_0$ and $R_1$ respectively, and $\hat{H}_0^*$ is the complex conjugate of the $H_0$. The receiver uses one of the channel estimates (the one with higher signal to noise ratio) $H_1$ or $H_0$ to decode the symbols $S_0$ and $S_1$.

In one embodiment, the receiver 150 determines the residual carrier frequency offset according to relations 8, 9 or/and 10 for the fifty two tones/subcarriers in the HT-SIG field of IEEE802.11n frame. The receiver 150 corrects the residual carrier frequency offset of multiple LTFs based on the computed residual carrier frequency offset in the HT-SIG. The MIMO channels are then estimated using the multiple LTFs. The channel estimates are used for decoding the data symbols according to the relation 10 and 11. Thus, $H_0$ and $H_1$ (and their conjugates) in the relations 7 and 8 represent the channel response more accurately.

Alternatively, the receiver 150 uses the residual carrier frequency offset computed for channel estimation, in the subsequent frame decoding. In another embodiment, the receiver 150 initializes a PLL using the determined carrier frequency offset to decode the data. An example receiver implemented with one or more aspects of the present disclosure is further described below.

Figure 6:
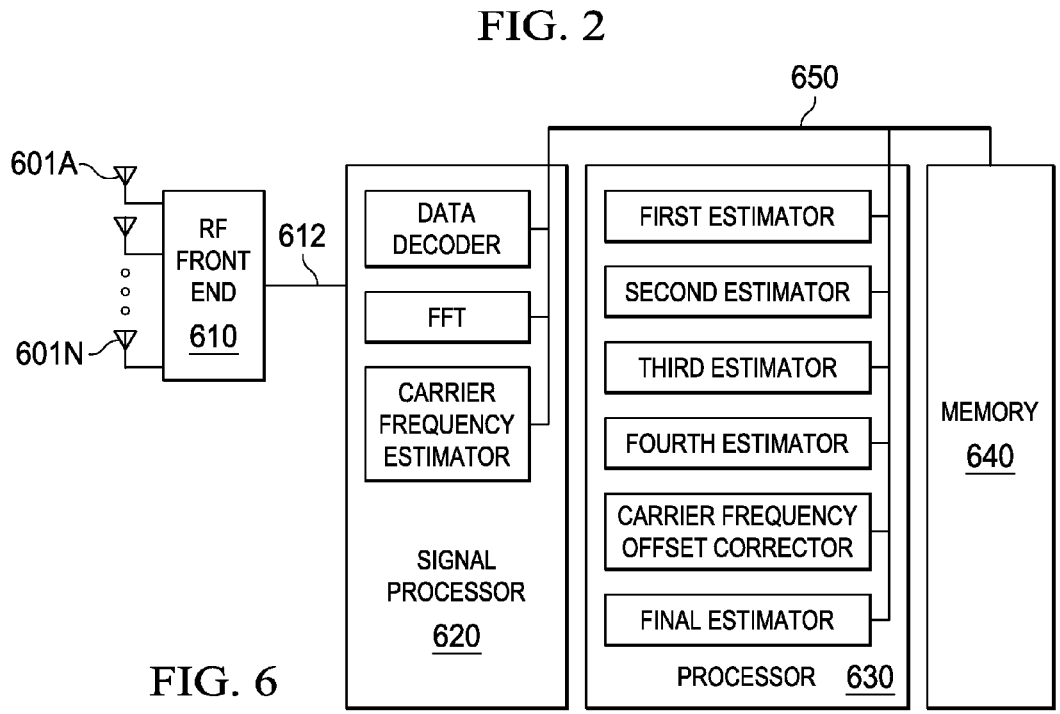
FIG. 6 is a block diagram of an example receiver, according to one embodiment.

FIG. 6 is a block diagram of an example receiver 150, according to one embodiment. As shown, the receiver 150 comprises set of receiver antennas 601A through 601N, a RF front end 610, a signal processor 620, a data processor 630 and a memory 640. Each block is described below in further detail.

The one of data processor 630 and the signal processor 620 are configured to perform estimates of the channel as described in the paragraphs above. In one embodiment, the data processor 630 and the signal processor 620 comprises one or more estimating units (estimators) each configured to perform the estimates in part (for example, as per the blocks of FIG. 2). Further, signal processor 620 is configured to extract the data (for example, operate as decoder) from each OFDM subcarriers using signal processing techniques such as FFT. The RF front end 610 is include elements such as RF signal processing circuitry to receive the signal from the communication channel 120 through one or more antennas in the set of antennas 601A through 601N. The memory 620 is configured to store the results and temporary data for computational purpose and further reference. The memory 620 may also store parts of the program instructions for performing the desired estimates and decoding of the data. The elements 620-630 operate in conjunction to estimate the channel and carrier frequency offset as described in the sections above.

In one embodiment, the receiver comprises a smoothening filter (not shown) that smoothes the fifty two averaged estimates of relation 4 above and the estimates of remaining four subcarriers from the fifty six subcarriers of the HT-LTF to improve the accuracy of the channel estimate.

In a conventional receiver, the residual Carrier Frequency Offset (CFO) is determined and corrected using a PLL (Phase Locked Loop) during decoding of the data field. In such conventional receiver, the estimated channel may have higher noise level due to the uncorrected frequency offset during the channel estimation. In MIMO systems, the residual CFO affects the channel estimation more severely compared to SISO systems. In MIMO systems, in the presence of residual CFO the channel matrix is not accurately estimated. This results in inter-spatial stream interference (ISSI) as the multiple Eigen-channels cannot be decoupled at the receiver and causes severe performance degradation in channel estimation in MIMO systems.

In another embodiment of the present disclosure, the receiver 150 is configured to determine the carrier frequency offset before the channel estimation and to perform the channel estimation after the correcting the carrier frequency offset. Thus, the channel is estimated accurately (or the signal to noise ratio of the channel estimate is enhanced). The manner in which receiver 150 determines and correct the carrier frequency offset prior to channel estimation is described in further detail below.

While various examples of the present disclosure have been described above, it should be understood that they have been presented by way of example, and not limitation. Thus, the breadth and scope of the present disclosure should not be limited by any of the above-described examples, but should be defined in accordance with the following claims and their equivalents.

What is claimed is:

1. A method comprising:
   determining a first estimate of a channel using a first part of a received signal;
   determining a second estimate of the channel using a second part of the received signal;
   determining a final estimate of the channel using the first and the second estimates; and
   decoding an information from the received signal using the final estimate of the channel, wherein the first part comprises information for decoding the received signal in a first communication mode and the second part comprises information for decoding the received signal in a second communication mode.

2. The method of claim 1, wherein the first part comprises first set of sub-carriers carrying first preamble in first time duration and second part comprises a second set of sub-carriers carrying second preamble in second time duration, wherein the second set of subcarriers comprise common sub-carriers that are present in the first set of subcarriers.

3. The method of claim 2, further comprising;
   determining the first estimate from the common sub-carriers in the first time duration;
   determining the second estimate from the common sub-carriers in the second time duration;
   determining a third estimate from third set of sub-carriers in the second time duration, wherein the third set of subcarriers are present in second set of subcarriers and are not present in the first set of subcarriers;
   determining a fourth estimation by combining the first estimate and second estimate based on the power of first set of subcarriers and second set of subcarriers; and
   determining the final estimate by combining the fourth estimate and the third estimate.

4. The method of claim 3, wherein received signal is in the high throughput mixed mode (HT-MM) format of 802.11n communication standards and the first part comprises legacy long training field (L-LTF) and the second part comprises high throughput long training field (HT-LTF) in the HT-MM.

5. The method of claim 4, wherein the first set of sub-carriers comprises fifty two sub-carriers representing the first set of symbols in the L-LTF and the second set of sub-carriers comprises the same fifty two sub-carriers of a fifty six sub-carriers carrying second set of symbols in the HT-LTF, wherein the third estimate is determined from the four sub-carriers present in the HT-LTF that are not present in the L-LTF.

6. The method of claim 2, wherein the received signal comprising one or more cyclically shifted signals transmitted from corresponding number of transmit antennas of a Multiple input and multiple output (MIMO) communication system, wherein each cyclically shifted signal comprising the first part and the second part and the residual carrier frequency offset and correcting the phase offset are performed before determining the first estimate, second estimate, the third estimate and fourth estimate.

7. The method of claim 6, further comprising estimating the first channel coefficient using relation:

$$\hat{H}_{r,k} = (A^*A)^{-1} A^* R_{r,k},$$

wherein $\hat{H}_{r,k}$ is the first channel coefficient of the channel established between a transmit antenna and $r^{th}$ receive antenna for $k^{th}$ sub-carrier, and the $R_{r,k}$ is a received signal component corresponding to $k^{th}$ sub-carrier, "A" is an operator expressing a relation among the first part, the second part and the angle corresponding to the cyclic shifted signals.

8. A receiver comprising:
   a first estimator configured to determine first estimate of a channel using a first part of a received signal;
   a second estimator configured to determine a second estimate of the channel using a second part of the received signal;
   a final estimator configured to determine a final estimate of the channel using the first and the second estimates; and
   a decoder configured to decode an information from the received signal using the final estimate of the channel, wherein the first part comprises information for decoding the received signal in a first communication mode second part comprises information for decoding the received signal in a second communication mode.

9. The receiver of claim 8, wherein the first part comprises first set of sub-carriers carrying first preamble in first time duration and second part comprising a second set of sub-carriers carrying second preamble in second time duration, wherein the second set of subcarriers comprise a common sub-carriers that are present in the first set of subcarriers.

10. The receiver of claim 9, wherein the first estimator is further configured to determining the first estimate from the common sub-carriers in the first time duration and the second estimator further configured to determine second estimate from the common sub-carriers in the second time duration.

11. The receiver of claim 10, further comprising:
a third estimator configured to determine a third estimate from a third set of sub-carriers in the second time duration, wherein the third set of subcarriers are present in second set of subcarriers and are not present in the first set of subcarriers and a fourth estimator configured to determine a fourth estimation by combining the first estimate and second estimate based on the power of first set of subcarriers and second set of subcarriers, wherein the final estimator determines the final estimate by combining the fourth estimate and the third estimate.

12. The receiver of claim 11, wherein received signal is in the high throughput mixed mode (hr-MM) format of 802.11n communication standards and the first part comprises legacy training field (L-LTF) and the second part comprises high throughput training field (HT-LTF) in the HT-MM.

13. The receiver of claim 12, wherein the first set of sub-carriers comprises fifty two sub-carriers representing the first set of symbols in the L-LTF, the second set of sub-carriers comprises the same fifty two sub-carriers of a fifty six sub-carriers carrying second set of symbols in the HT-LTF and the third estimate is determined from the four sub-carriers present in the HT-LTF that are not present in the L-LTF.

14. The receiver of claim 13, wherein the received signal comprises one or more cyclically shifted signals transmitted from corresponding number of transmit antennas of a Multiple input and multiple output (MIMO) communication system, wherein each cyclically shifted signal comprises the first part and the second part.

15. The receiver of claim 14, further comprising estimating the first channel coefficient using relation:

$$\hat{H}_{r,k}=(A^*A)^{-1}A^*R_{rk},$$

wherein $\hat{H}_{r,k}$ is the first channel coefficient of the channel established between a transmit antenna and $r^{th}$ receive antenna for $k^{th}$ sub-carrier, and the $R_{rk}$ is a received signal component corresponding to $k^{th}$ sub-carrier, "A" is an operator expressing a relation among the first part, the second part and the angle corresponding to the cyclic shifted signals.

16. The receiver of claim 8, further comprising a processor configured to determine a first residual carrier frequency offset from a first part of a received signal, and the processor configured to correcting a second residual carrier frequency offset of a second part of the received signal using the first residual carrier frequency offset, wherein the estimate of the channel is determined after the correcting the phase offset.

17. The receiver of claim 16, wherein the received signal is received through MIMO communication channels complying with the one or more modes of 802.11n communication standards and the first part comprises set of symbols at least in one of legacy signal field (L-SIG) and high throughput signal field (H-SIG) and the second part comprises set of symbols in at least one of high throughput training fields (HT-LTFs).

18. The receiver of claim 17, wherein the processor is further configured to determine individual carrier frequency offset of each sub-carrier in the set of sub carriers carrying the set of symbols in one of the L-SIG and H-SIG and applying a scaling factor to individual carrier frequency offset, wherein the scaling factor is dependent on the channel magnitude.

\* \* \* \* \*